(12) United States Patent
Takaoka

(10) Patent No.: US 7,119,912 B2
(45) Date of Patent: Oct. 10, 2006

(54) RANGING SENSOR AND ELECTRONIC DEVICE USING THE SAME

(75) Inventor: Takashi Takaoka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 350 days.

(21) Appl. No.: 10/461,506

(22) Filed: Jun. 16, 2003

(65) Prior Publication Data
US 2004/0001193 A1 Jan. 1, 2004

(30) Foreign Application Priority Data
Jun. 26, 2002 (JP) .............................. 2002-185541

(51) Int. Cl.
G01S 17/48 (2006.01)
(52) U.S. Cl. ..................... 356/623; 356/3.03; 396/111
(58) Field of Classification Search ........... 356/3–3.09, 356/602, 623; 250/559.38, 201.6, 559.31; 396/111, 106
See application file for complete search history.

(56) References Cited

U.S. PATENT DOCUMENTS

| | | | | |
|---|---|---|---|---|
| 4,723,142 A | * | 2/1988 | Momiyama et al. | 396/111 |
| 4,913,546 A | * | 4/1990 | Nagaoka et al. | 356/3.08 |
| 5,113,080 A | * | 5/1992 | Leu et al. | 250/559.38 |
| 6,833,909 B1 | * | 12/2004 | Schmidt et al. | 250/201.6 |
| 6,844,562 B1 | * | 1/2005 | Takaoka et al. | 250/559.38 |

FOREIGN PATENT DOCUMENTS

| | | |
|---|---|---|
| JP | 2-12009 A | 1/1990 |
| JP | 4-256807 A | 9/1992 |
| JP | 4-118686 U | 10/1992 |
| JP | 6-300856 A | 10/1994 |
| JP | 8-62480 A | 3/1996 |
| JP | 10-62159 A | 3/1998 |
| JP | 10-267647 A | 10/1998 |
| JP | 2003-287420 A | 10/2003 |

* cited by examiner

Primary Examiner—Richard A. Rosenberger
(74) Attorney, Agent, or Firm—Birch, Stewart, Kolasch & Birch, LLP

(57) ABSTRACT

A ranging sensor includes: a light emitting element; a projection lens for projecting light emitted from the light emitting element to an object; a condenser lens for condensing light reflected from the object; and a light receiving element, provided at the light condensing position of the condenser lens, for transmitting an output signal which varies according to the position of the object by receiving the reflected light at the light receiving surface thereof, wherein the condenser lens is held by a holding member so that the condenser lens is movable in a predetermined direction. Consequently, it becomes possible to easily adjust the output.

15 Claims, 8 Drawing Sheets

$\dfrac{C}{A} = D$ (DISTANCE RATIO)
(C > A)

IVB-IVB CROSS SECTION

IVC-IVC CROSS SECTION $\dfrac{C}{A} = D$ (DISTANCE RATIO)
(C>A)

RANGING SENSOR AND ELECTRONIC DEVICE USING THE SAME

This nonprovisional application claims priority under 35 U.S.C. § 119(a) on Patent Application No(s). 2002-185541 filed in JAPAN on Jun. 26, 2002, which is(are) herein incorporated by reference.

BACKGROUND OF THE INVENTION

1. Field of the Invention

The present invention generally relates to a ranging sensor and, more particularly, to a ranging sensor for detecting the distance to the object, and others, by projecting light to the object and receiving the light reflected from the object. The present invention also relates to an electronic device with such a ranging sensor.

2. Description of the Background Art

A ranging sensor applying a so-called triangulation ranging method is applied is known as a device for measuring the distance to an object.

FIG. 8 is a schematic diagram for describing the principle of measurement of distance in a ranging sensor applying such a triangulation ranging method.

Pulse light emitted from a light emitting diode (LED) 101, which is a light emitting element, is converted to a fine beam by means of a projection lens 133 and is projected toward objects 150 and 160. Light reflected from objects 150 and 160 is condensed onto a light receiving surface of a position sensing device (PSD) 102, which is a light receiving element, by means of a condenser lens 138. The PSD is a semiconductor element which detects the position of incident light.

Herein, as shown in FIG. 8, the position (spot position) at which the reflected light has been condensed by means of condenser lens 138 becomes a position which varies in accordance with the distance from the ranging sensor to the object. The light receiving surface of PSD 102 is arranged so as to overlap the range of fluctuation of this position of the condensed light. As a result, a pair of photoelectric power outputs outputted from PSD 102 is processed, thereby measuring the distance to the object.

Herein, it is possible, in addition to a PSD, to use a division-type photodiode or the like having a plurality of light receiving surfaces as a light receiving element.

FIG. 9 is a cross sectional view for describing the structure of a conventional ranging sensor applying the above-described triangulation ranging method.

LED 101, PSD 102 and a control integrated circuit (IC) 103 are mounted on a lead frame 108 by means of die bonding, wire bonding or the like.

These are surrounded by and sealed into light transmitting resin 109. Furthermore, the outside of light transmitting resin 109 is encased in a case 111a made of a light shielding resin. At this time, optical windows for transmitting light are provided on the upper side of case 111a in positions opposite to at least LED 101 and PSD 102. A lens case 111b in which a projection lens 133 and a condenser lens 138 are integrally formed by a light transmitting resin is attached to the upper surface of case 111a.

FIG. 10 is a circuit configuration diagram of a conventional ranging sensor. A clock pulse having a constant period emitted by an oscillation circuit provided within a signal processing circuit 106 is supplied to a timing oscillation circuit also provided within signal processing circuit 106, so that a drive pulse is generated. This drive pulse is inputted into a light emitting circuit 104, so that LED 101 emits light.

On the other hand, a pair of faint photoelectric current outputs obtained by PSD 102, by sensing the reflected light, is amplified by an amplification circuit 105 and, then, is inputted into signal processing circuit 106. An operation is carried out based on this input signal in signal processing circuit 106, and the result thereof is outputted to the outside via an output circuit 107. Herein, the above-described light emitting circuit 104, amplification circuit 105, signal processing circuit 106 and output circuit 107 are usually integrated into control IC 103 so as to be in one package.

As for the signal processing method, there are an analog output method for outputting information concerning the distance to an object by using the variation in the amount of output in accordance with distance as shown in FIG. 11 and an H/L output method for outputting a high (H) or low (L) pulse in comparison with a preset threshold value.

An error occurs, however, between the actual distance to an object and the output of the ranging sensor in either output method. This error is caused due to (1) variation in assembling position precision of the LED, projection lens, condenser lens and PSD; and (2) variation in element characteristics such as the light emitting characteristics and the light receiving characteristics of the LED and PSD.

In the analog output method, for example, an output characteristic curve C or an output characteristic curve E, shown with dotted line in FIG. 11, can be obtained by the above-described variation with respect to a reference output characteristic curve C shown with solid line in FIG. 11. As described above, an error is caused between the actual distance to the object and the output of the ranging sensor due to the variation in the assembling position precision and the variation in the element characteristics. Similarly, this may be also caused in the H/L output method.

As a method for achieving a reduction of such an error in output, there is a method of actually installing an object after assembling a ranging sensor, performing ranging by using the ranging sensor, and adjusting the resulting output to a proper value.

As shown in FIG. 10, for example, there is a method of providing an external variable resistance 107a previously connected to output circuit 107, and electrically adjusting an output by altering a resistance value R of external variable resister 107a, thereby reducing an error. In the case that this technique is used, however, an additional external circuit becomes necessary and a problem arises wherein the cost of manufacture increases.

In addition, there is a technique wherein no adjustment is carried out in the manufacturing process of a ranging sensor and the output of the ranging sensor is corrected by the user using a microcomputer. This technique, however, is not preferable because the burden to the user is great.

There is another technique wherein the output of a ranging sensor is mechanically adjusted. The ranging sensor shown in FIG. 12 is formed so that the position of PSD 202, which is attached to the upper surface of a lead frame 208, is adjustable. That is to say, electrodes 260 on lead frame 208 to which the terminals of PSD 202 are connected are formed so as to be larger than the electrodes to which the terminals of an LED 201 and the terminals of a control IC 203 are connected. Thereby, it becomes possible to adjust the position wherein PSD 202 is attached to lead frame 208 in the direction of arrow F in the figure while monitoring the output of the ranging sensor. Adjustment of output is carried out according to the above positional adjustment.

However, the position where PSD 202 is attached is determined while the output of the ranging sensor is being monitored according to this technique and a problem arises because of the requirement for this very difficult task.

In the ranging sensor shown in FIG. 13, divided lead frames 308a and 308b are provided so that an LED 301 and a PSD 302 are mounted on the separate lead frames. That is to say, adjustment of the output is carried out by shifting the position of lead frame 308b in the direction of arrow G in the figure while monitoring the output after mounting.

However, it is necessary to utilize flexible wires 370, or the like, in order to secure an electrical connection between divided lead frames 308a and 308b according to this technique and, therefore, the cost of manufacture is increased. In addition, a problem arises wherein the size of the device tends to increase.

SUMMARY OF THE INVENTION

The present invention has been made to solve the above-described problems, and an object thereof is to provide a ranging sensor capable of easily adjusting the output.

Another object of the present invention is to provide an electronic device with such a ranging sensor.

The ranging sensor according to one aspect of the present invention is provided with: a light emitting element; a projection lens for projecting light emitted from this light emitting element to an object; and a condenser lens for condensing light reflected from this object. A light receiving element is provided, at the light condensing position of the above described light condensing lens, for transmitting an output signal that varies according to the position of the above described object by receiving the above described reflected light on the light receiving surface thereof. This ranging sensor is provided with a holding member for holding the above described condenser lens and for allowing this condenser lens to shift in a predetermined direction.

According to the present invention adjustment of the output becomes possible in accordance with a very simple method wherein the position of the condenser lens is adjusted by attaching the condenser lens to the holding member so that the condenser lens is freely movable. Conventionally, adjustment of the position of the light receiving element, instead of the condenser lens, has been attempted and a very complicated device configuration and very complicated adjustments are required from the point of view of the electrical connections of the light receiving element, or the like, according to this method. However, the condenser lens is made to be movable as in the above described configuration and, thereby, it becomes possible to manufacture a compact ranging sensor at a low cost with fewer components than in the prior art as well as with an easily adjustable output.

According to the preferred embodiment of the present invention the direction in which the above described condenser lens shifts includes, at least, a component of the direction parallel to the line connecting the above described light emitting element and the above described light receiving element.

Adjustment of output can be carried out in a ranging sensor in the case where the condenser lens is movable so as to include at least the component of the above described direction. The design and manufacture of a ranging sensor are easy in the case where a condenser lens is attached to the holding member so that the condenser lens is movable in one direction relative to the holding member and the possibility of implementation becomes high.

According to a more favorable embodiment of the present invention the condenser lens is positionally adjusted so as to be secured to the holding member so that an appropriate output signal can be obtained in accordance with position of the above described object.

Thus, the condenser lens, which is attached to the holding member so to be freely movable, is secured to this holding member so as not to shift in position after positional adjustment is made and, thereby, it becomes possible to provide a ranging sensor that is stable and precise over a long period of time and that can induce an output signal.

According to a more preferable embodiment of the present invention the above described holding member holds the above described condenser lens and includes a cylindrical rotation body having a center of rotation at a position that is different from the position of the center of this condenser lens and a cylindrical case for holding the above described rotation body so that the rotation body is freely rotatable and the above described rotation body is rotated and shifted in the condition wherein the above described condenser lens is held and, thereby, the above described condenser lens is shifted so that the light condensing spot shifts in an arc on the above described light receiving element.

According to the present invention the greater is the range finding distance, the smaller becomes the amount of shift of the light condensing spot and, therefore, adjustment is carried out by shifting the light condensing lens. In this case, it becomes necessary to shift the position of the lens by a microscopic amount so as to have a ratio of 1 to 1 with respect to a microscopic amount of shift (to a precision several μm) of the light condensing spot. A structure is adopted wherein a condenser lens is installed in a cylindrical rotation body having a center of rotation different from the center of the condenser lens because of the necessity for coping with the above and for carrying out adjustment with a high precision. This rotation body is held in a case having a cylindrical holding part that holds the rotation body so that the rotation body is freely rotatable and the rotation body is driven to rotate. Thereby, the center of the condenser lens being eccentric as the center of rotation of the rotation body can shift in an arc form. Accordingly, the light condensing spot on the light receiving element shifts in an arc form, including the direction parallel to the line connecting the light emitting element and the light receiving element. Thereby, adjustment becomes possible. In this case the spot of the condenser lens shifts so as to draw an orbit in an arc form and, therefore, it is desirable to set the amount of eccentricity between the center of rotation of the rotation body and the center of the condenser lens so that the spot does not miss the light receiving element.

In addition, the amount of shift of the center of the condenser lens becomes small even when a large amount of shift takes place at the time of adjustment of the operation unit and, thereby, microscopic adjustment is easily made possible in the case where the ratio of the distance between the operation unit to which force is applied in order to shift and rotate the rotation body and the center of rotation of the rotation body to the amount of eccentricity (distance) between the center of rotation of the rotation body and the center of the condenser lens is set at a large value.

A method for installing an operation unit within the region of the rotation body in a direction different from the direction of eccentricity between the center of rotation of the rotation body and the center of the condenser lens and a method for providing an operation unit so that the operation unit protrudes from the surface of the rotation body can be considered as methods for providing the operation unit for rotating this rotation body.

In the, former, case of installation within the region of the rotation body, the form of the entirety of the ranging sensor rarely changes and the above described distance ratio is restricted by the size of the rotation body and a limitation occurs wherein the distance ratio cannot be increased.

In addition, in the, latter, case wherein a protruding operation unit is provided, though the above described distance ratio can be freely set by lengthening the protruding portion, it becomes necessary to cut off and process such a protruding portion after adjustment. In either case, the effects wherein microscopic adjustment can easily be carried out can be obtained, in comparison with the case of direct adjustment of the condenser lens.

Furthermore, it is necessary to reduce the shift of the rotation body at the time of fixing because the rotation body is fixed after adjustment and, therefore, it is desirable to provide a structure wherein an application hole is provided for the introduction of adhesive to the case so that the rotation body can be fixed by means of an instant adhesive or by means of a UV curing adhesive.

Furthermore, it is preferable to provide a structure wherein an embossing process is carried out on the respective surfaces of the cylindrical rotation body and the cylindrical guide, which are adhered to each other, so as to increase the area of the region of adhesion, to which adhesive is applied, so that these can be fixed to each other.

According to a more preferable embodiment of the present invention the above described case is further provided with a means for preventing the shift of this rotation body in the direction of the rotational axis, which crosses the direction of rotation of the above described rotation body at a right angle.

According to a more preferable embodiment of the present invention a position detection element or a plurality of photodiodes is utilized as the above described light receiving element.

Still another aspect of the present invention relates to an electronic apparatus provided with the above described ranging sensor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

Figure 1:
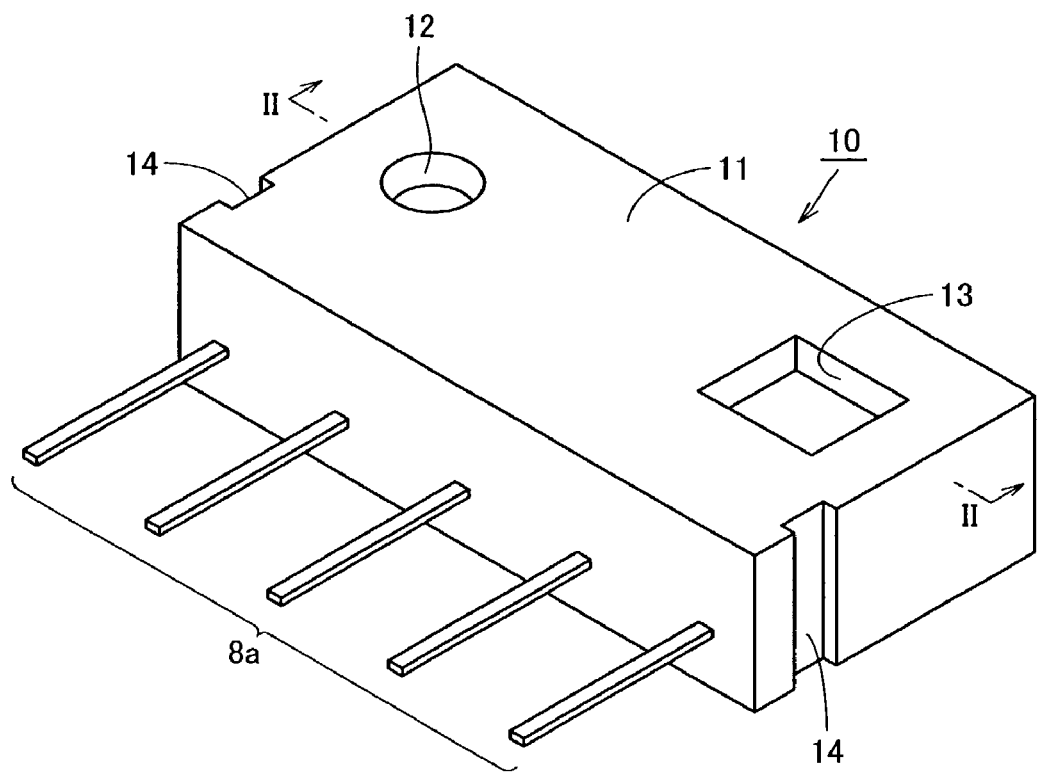
FIG. 1 is a perspective view for describing the structure of a case sub-assembly forming a ranging sensor according to an embodiment of the present invention.
Figure 2:
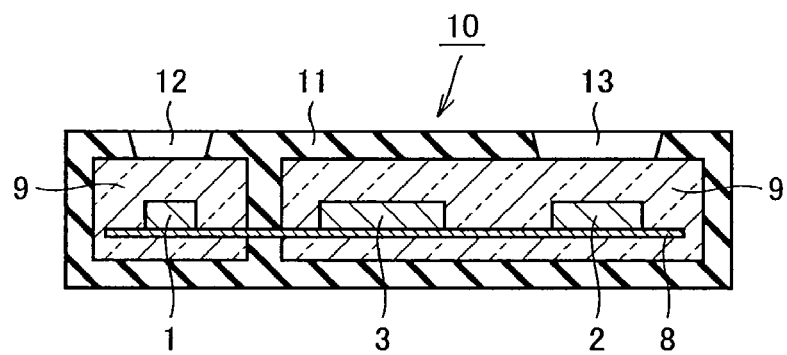
FIG. 2 is a cross sectional view taken along line II—II of FIG. 1 as viewed in the direction of the arrow.

With reference to FIGS. 1 and 2, the structure of a case sub-assembly (device) 10 forming a ranging sensor will be described. Case sub-assembly (device) 10, which is a first sub-assembly, has therein a lead frame 8 mounted an LED 1, a PSD 2 and a control IC 3 thereon. LED 1, PSD 2 and control IC 3 are surrounded by and sealed into light transmitting resin 9. Furthermore, the outside of light transmitting resin 9 is sealed in a case 11 made of a light shielding resin.

Optical windows 12 and 13 for transmitting light are provided in upper surface portions of case 11 that face LED 1 and PSD 2. Terminals 8a, which are used as electrical leads to the outside, protrude from predetermined positions of case 11. Terminals 8a extend from lead frame 8 to the outside of case 11.

Slits 14 are provided on the sides of case 11 so that a shield terminal for shielding, which will be described later, is engaged in the slits.

With reference to FIGS. 3A to 4C, a lens case sub-assembly 30, which is a second sub-assembly, is attached to case sub-assembly (device) 10, which is a first sub-assembly, thereby a ranging sensor is formed. Furthermore, a shield plate 21 is preferably provided between case sub-assembly (device) 10 and lens case sub-assembly 30. Optical windows for transmitting light are provided in predetermined positions of the shielding surface of shield plate 21.

Lens case sub-assembly 30 is a holding member designed so as to cover the upper surface of case sub-assembly 10 and is provided with a projection lens 33. In addition, lens case sub-assembly 30 is provided with a cylindrical guide frame 34 engaged with a rotation body 36 incorporated a condenser lens 38 therein.

The inner diameter of cylindrical guide frame 34 is set so as to have appropriate clearances in the outer peripheral dimensions of rotation body 36. Consequently, cylindrical guide frame 34 holds rotation body 36 and only facilitates smooth rotation movement of rotation body 36.

A stopper having a size smaller than the diameter of rotation body 36 and a size large enough not to block exposure of the surface of the condenser lens is provided in the upper portion of cylindrical guide 34 so that condenser lens 38 and the light receiving element are located at the focal distance of the light receiving element away from each other inside of rotation body 36. Rotation body 36, which is held by case sub-assembly (device) 10 and by lens case sub-assembly 30 from above and from below, can only be moved in the rotating direction and can place condenser lens 38 and the light receiving element at the focal distance of the light receiving element away from each other.

Rotation body 36 and condenser lens 38 are provided so as to create the eccentricity between the position of rotational center Q of rotation body 36 and center P of condenser lens 38. These positions are selected so that center P of condenser lens 38 shifts in an eccentric manner at the time when rotation body 36 rotates and moves. In addition, these positions shift in an arc orbit having a component in the direction of the length of the base line connecting the light receiving point and the light emitting point and, therefore, the position of detection wherein light condenses to a spot on PSD to shifts in the same arc orbit. At that time, it is necessary to set the amount of eccentricity between the position of rotational center Q of rotation body 36 and the position of center P of condenser lens 38 so that the light condensing in the arc orbit does not miss PSD 2.

It becomes possible to facilitate the movement adjustment operation by providing, in rotation body 36, an operation unit 39 for operating rotation body 36 inside of cylindrical guide 34. Two concrete examples wherein rotation body 36 is provided in operation unit 39 will be described below.

Figure 3A:
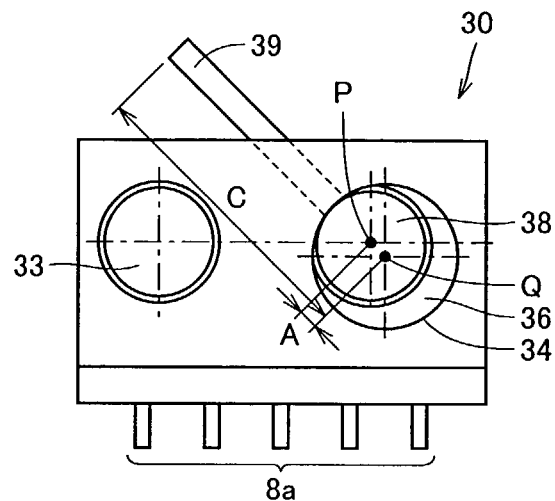
FIGS. 3A, 3B and 3C are a plan view, a side view and a front view, respectively, showing the appearance of the ranging sensor according to the embodiment of the present invention.
Figure 4A:
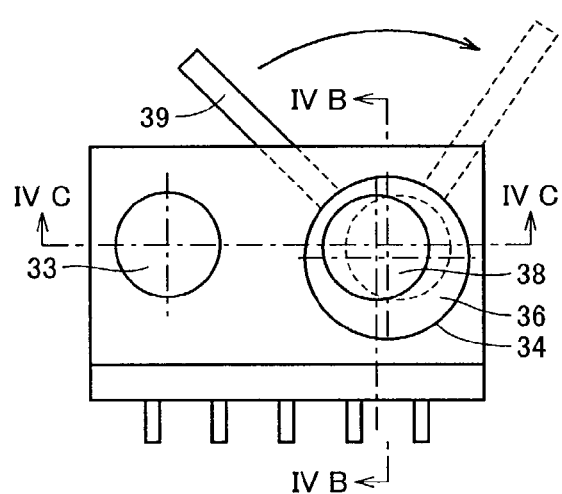
FIG. 4A is a plan view for describing the structure of the ranging sensor according to the embodiment of the present invention.
Figure 4B:
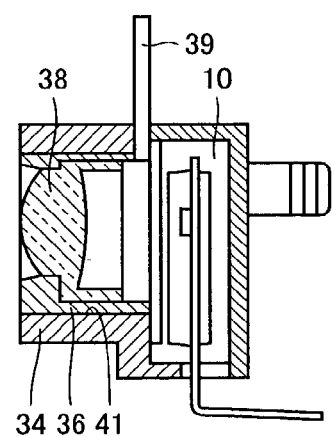
FIG. 4B is a cross sectional view taken along line IVB—IVB of FIG. 4A as viewed in the direction of the arrow.
Figure 4C:
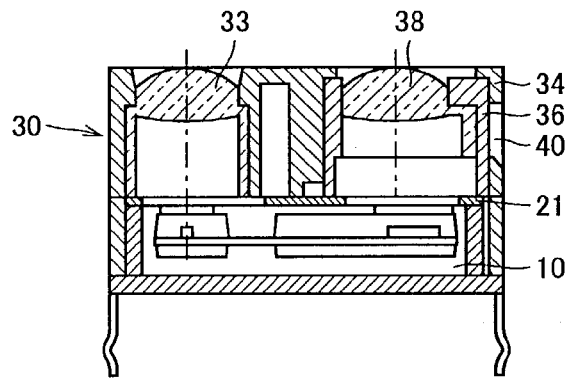
FIG. 4C is a cross sectional view taken along line IVC—IVC of FIG. 4A as viewed in the direction of the arrow.

The first concrete example will be described with reference to FIGS. 3A and 4A, wherein operation unit 39 is formed so as to protrude from rotation body 36. Consequently, a ratio (distance ratio) D of the amount A of eccentricity between center Q of the rotation body and center P of condenser lens 38 to a distance C between center Q of rotation body 36 and the tip end of operation unit 39 can be increased. Here, measures such as cutting off and processing protruding operation unit 39 become necessary after calibration so that the size of the external form is not increased. Thus, protruding operation unit 39 is cut off such that a process for eliminating the protrusion is carried out after adjusting the position of center P of condenser lens 38 and after rotation body 36 has been attached and fixed because the size of the external form becomes problematic.

It is necessary to prevent fluctuation in the position of the light condensing spot by fixing it after an arbitrary distance to an object is provided and after the output has been adjusted by means of rotation and shift as well as by usage of an eccentric center. Therefore, rotation body 36 is fixed to cylindrical guide 34 by means of a UV curing adhesive, an instant adhesive or the like.

Figure 3B:
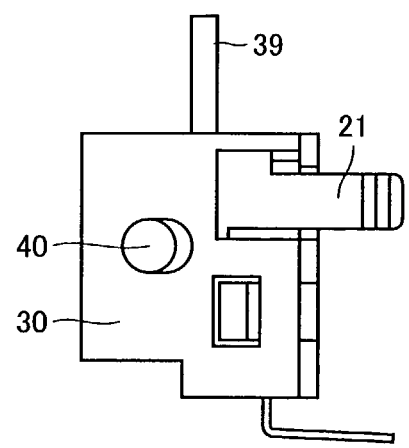
Figure 3C:
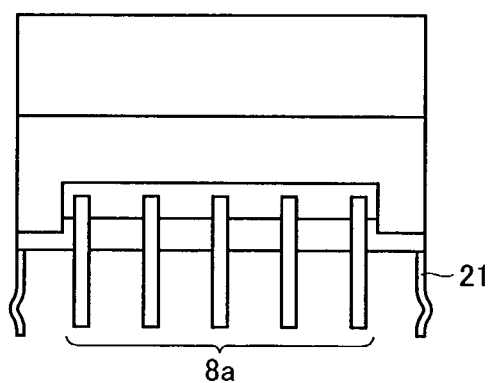

This is fixed as follows. A hole 40 for application of adhesive is provided in a portion of cylindrical guide 34 as shown in FIG. 3B. Adhesive is injected through hole 40 for application into gap 41 between the inner wall of cylindrical guide 34 and the external wall of rotation body 36. Capillary action occurring in gap 41 is utilized to expand the adhesive in order to connect the walls to each other. In this case, as for the surface processing of the external wall of rotation body 36 and of the inner wall of cylindrical guide 34, an embossing process instead of a mirror surface process reduces dispersion at the time of the formation of the respective products and fills in the gap in an appropriate manner resulting in a smooth rotation. In addition, an embossing process expands the surface area at the time of adhesion and allows strong adhesion and, therefore, is effective.

Figure 5A:
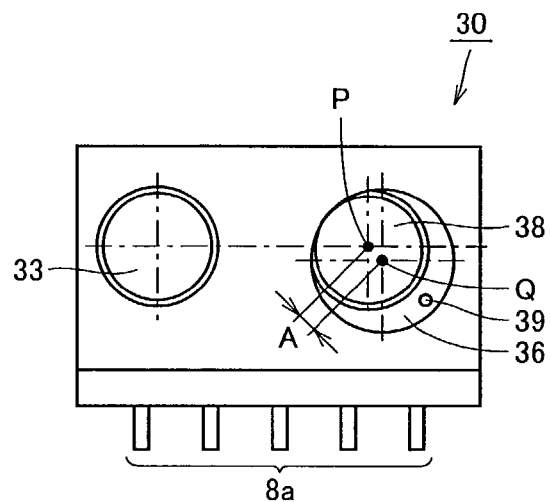
FIGS. 5A, 5B and 5C are views for describing the appearance of the ranging sensor according to the embodiment of the present invention in the case where an operation unit is installed in the region of a rotation body, respectively.
Figure 5B:
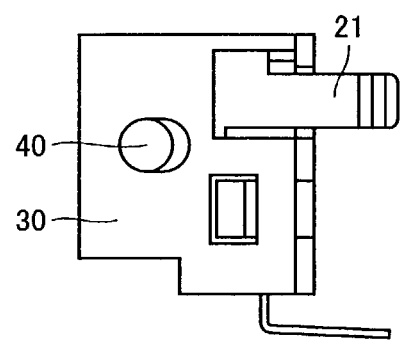
Figure 5C:
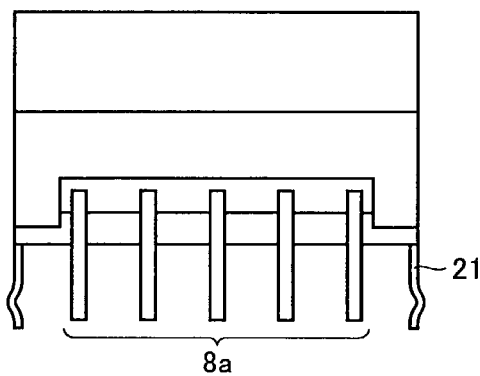

Here, though a case is illustrated wherein operation unit 39 protrudes from rotation body 36 to the side in the concrete example shown in FIGS. 3A to 4C, operation unit 39 may be provided within the region of rotation body 36 as shown in FIG. 5A as the second concrete example wherein operation unit 39 is provided in rotation body 36. Here, the embodiment shown in FIGS. 5A to 5C is the same as the embodiment shown in FIGS. 3A to 4C except for the following point and, therefore, the same reference numbers are attached to the same or corresponding parts and the descriptions thereof are not repeated.

In the case where operation unit 39 is installed within the region of rotation body 36 as shown in FIG. 5A, a distance greater than the amount of eccentricity between center Q of rotation of rotation body 36 and center P of condenser lens 38 is provided between center Q of rotation of rotation body 36 and operation unit 39. For example, operation unit 39 is installed in a direction different from the direction of eccentricity. Thereby, ratio D of amount A of eccentricity between center Q of the rotation body and center P of the condenser lens to distance C between center Q of the rotation body and the operation unit increases and, thereby, the shift of operation unit 39 relative to the shift of center P of the condenser lens can be increased so that microscopic adjustment becomes possible. Here, in the case where an additional microscopic adjustment is required, the structure wherein operation unit 39 protrudes from rotation body 36 is preferable as shown in FIGS. 3A and 4A.

The above described configuration implements a ranging sensor wherein condenser lens 38 is attached so as to be freely movable.

Figure 6:
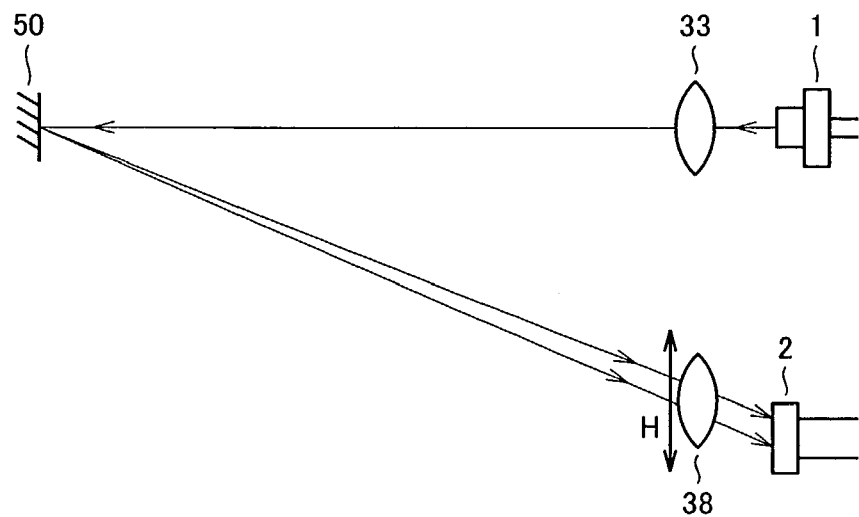
FIG. 6 is a schematic diagram for describing the principle of adjustment of the ranging sensor according to the present invention.

As shown in FIG. 6, condenser lens 38 is movable in the direction having a component of the direction of arrow H in the figure in the above described ranging sensor and, therefore, adjustment of the output can easily be carried out. That is to say, it becomes possible to condense light reflected from object 50, which has been projected from LED 1 via the projection lens 33, at an arbitrary position on the light receiving surface of PSD 2 by shifting condenser lens 38.

Accordingly, condenser lens 38 is shifted to a position wherein an appropriate output is obtained in accordance with the distance to an object and, thereby, adjustment of the output can easily be carried out.

In addition, in the present configuration the ranging sensor is formed so as to be divided into case sub-assembly 10 and lens case sub-assembly 30. It becomes possible to make case sub-assembly 10 an all-purpose product by dividing the assembly into two parts in the above described manner. That is to say, in the case where ranging sensors having differing specifications in regard to range, for example, are manufactured, case subassemblies 10 are shared while lens case subassemblies 30 alone are made in different forms in accordance with the specifications and, thereby, it becomes possible to reduce manufacturing costs.

Figure 7:
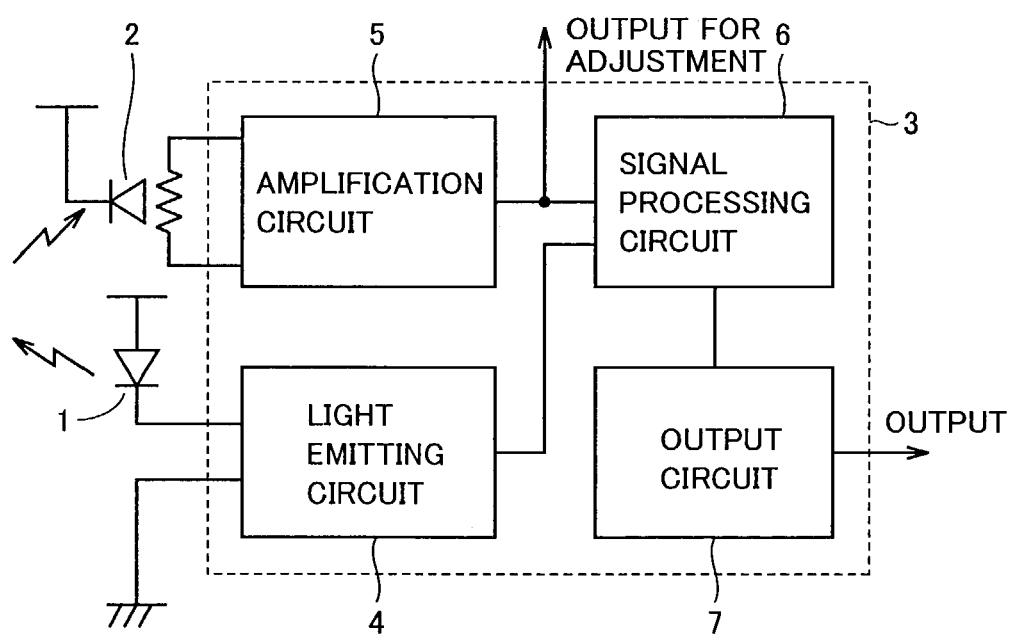
FIG. 7 is a circuit configuration diagram for describing a position detection circuit of the ranging sensor according to the present invention.
Figure 8:
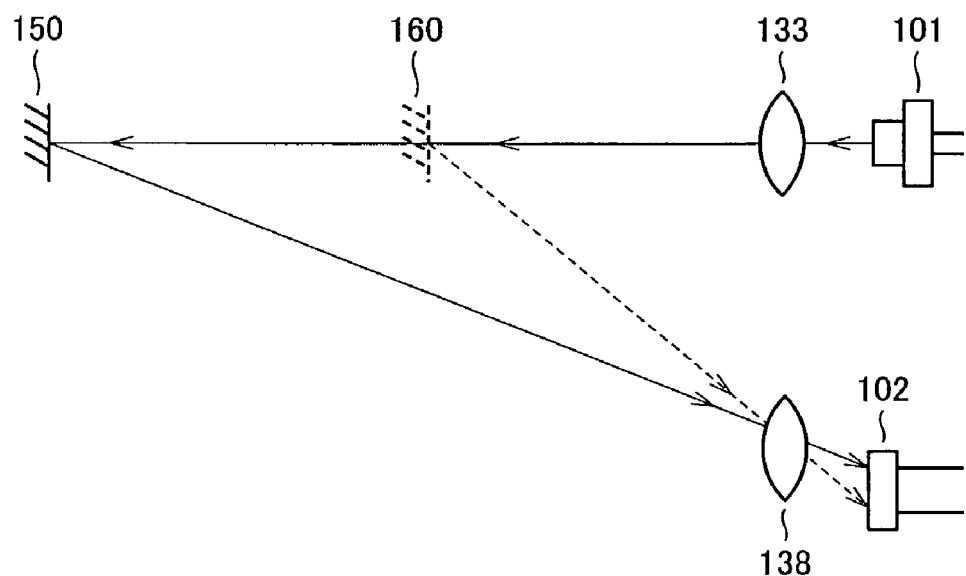
FIG. 8 is a schematic diagram for describing the principle of measurement of a distance in a ranging sensor applying a triangulation ranging method.
Figure 9:
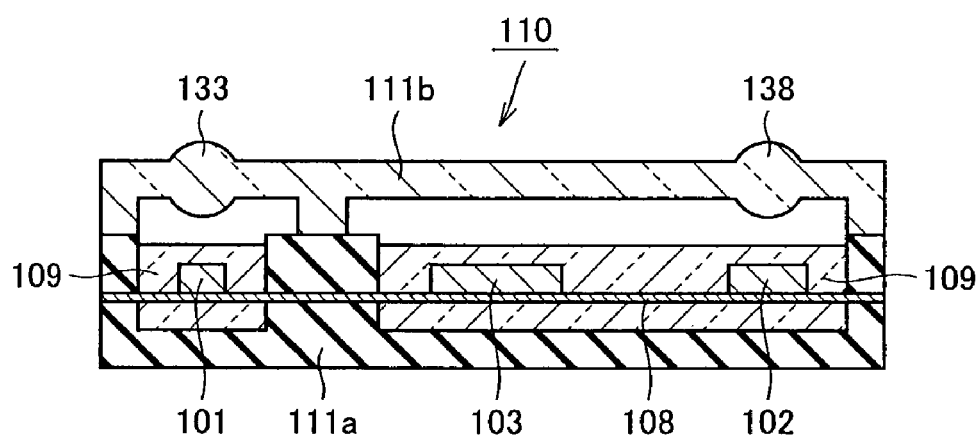
FIG. 9 is a cross sectional view showing the structure of a conventional ranging sensor.
Figure 10:
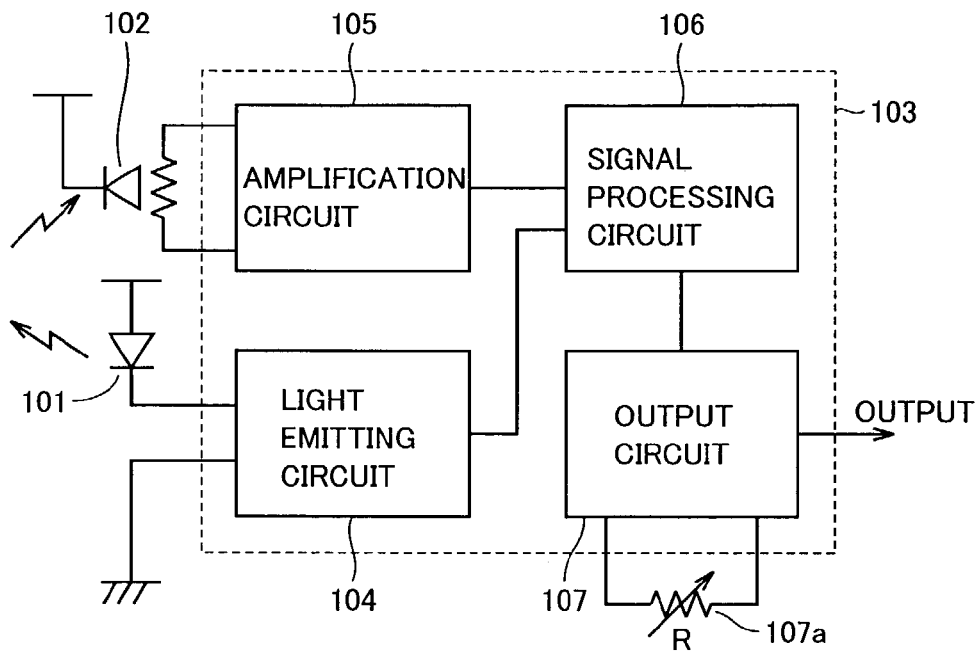
FIG. 10 is a circuit configuration diagram of the conventional ranging sensor.
Figure 11:
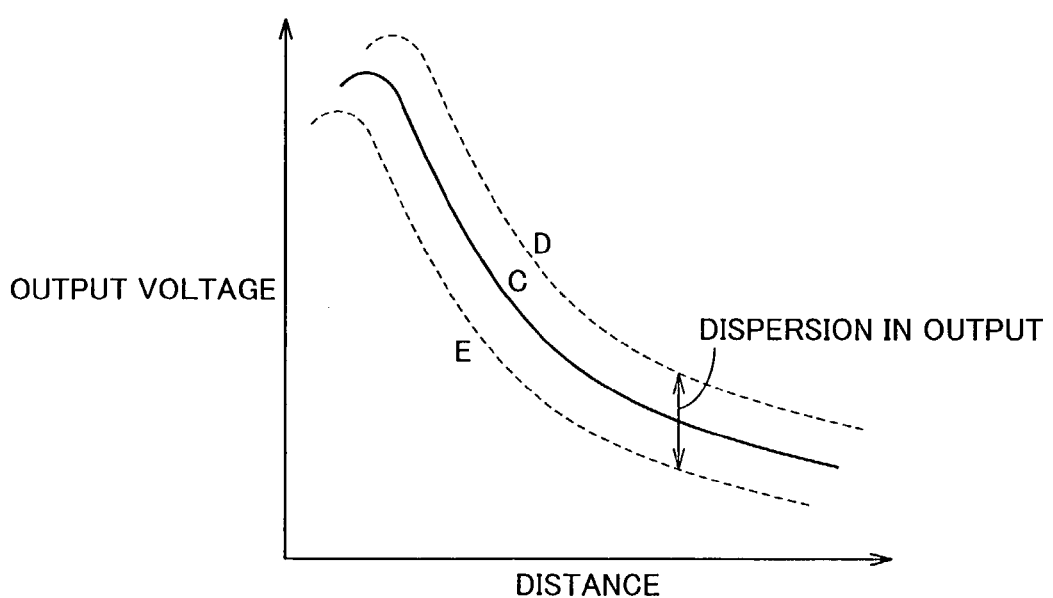
FIG. 11 is a graph showing variation in the element characteristics of a PSD.
Figure 12:
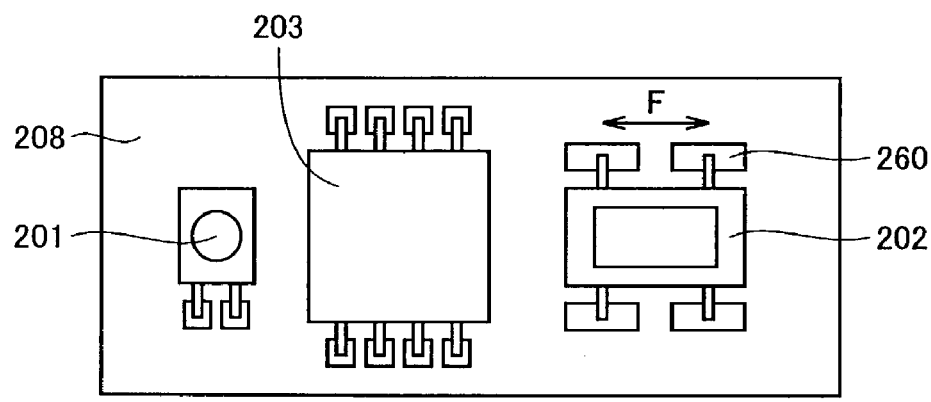
FIG. 12 is a top view of a lead frame showing the structure of another conventional ranging sensor.
Figure 13:
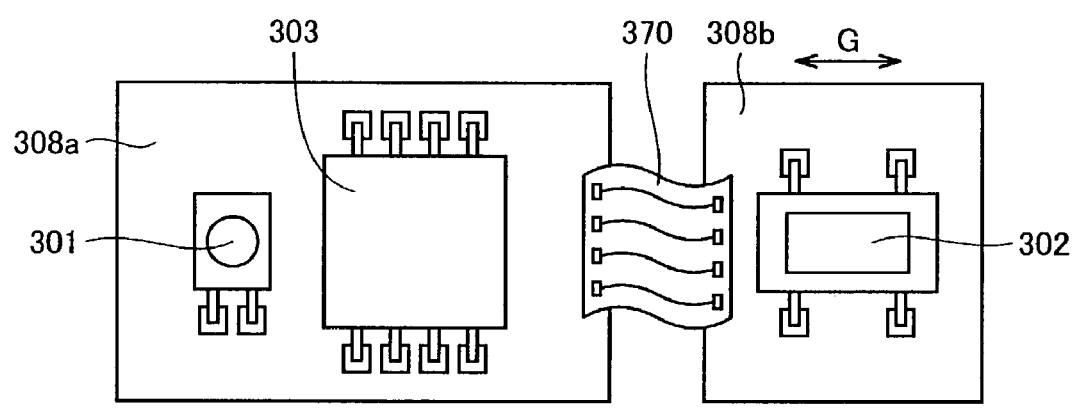
FIG. 13 is a top view of a lead frame showing the structure of still another conventional ranging sensor.

Here, the circuit configuration of the ranging sensor according to the present embodiment partially differs from the circuit configuration according to the prior art, as shown in FIG. 7. Concretely, the external variable resistor provided in output circuit 7 becomes unnecessary. In addition, a terminal for adjusting output that allows output for adjustment to be independently led out is provided between amplification circuit 5 and signal process circuit 6. Thereby, it becomes possible to guide the condenser lens to an appropriate position at the time of output adjustment of the ranging sensor by monitoring the output of the light receiving element from this terminal for adjusting output.

Here, in the case where output adjustment is carried out using a conventional output terminal, a process is carried out in signal processing circuit 6 and, therefore, a time lag easily occurs and it is preferable to separately provide a terminal for adjusting the output that does not pass through signal processing circuit 6, such as in the present embodiment.

Though the sensor herein illustrated is a so-called side view-type ranging sensor wherein light is projected in an approximately lateral direction relative to the surface of the substrate of the electronic apparatus to which the sensor is attached, it is possible to provide a so-called top view-type ranging sensor wherein light is projected in the plane direction of the surface of the substrate of the electronic apparatus to which the sensor is attached by changing the directions of protrusions of terminal 8*a*, which extends from lead frame 8, and of the shield terminal that extends from the shield.

Though the above described embodiments are described by illustrating a case wherein a ranging sensor is formed so as to be divided into a case sub-assembly and a lens case sub-assembly, the present invention is not specifically limited to this configuration. The configuration of the other parts is arbitrary as long as the ranging sensor has a configuration wherein the condenser lens is attached to a holding member so as to be freely movable and wherein the output adjustment is carried out by adjusting the position of the condenser lens.

According to the present invention, as described above, it is possible to provide a ranging sensor wherein adjustment of the output can easily be carried out, that is compact and that can be manufactured at a low cost and to provide an electronic apparatus with such a sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ranging sensor comprising:
    a light emitting element;
    a projection lens for projecting light emitted from said light emitting element to an object;
    a condenser lens for condensing light reflected from said object;
    a light receiving element, provided at the light condensing position of said condenser lens, for transmitting an output signal which varies according to the position of said object by receiving said reflected light at the light receiving surface thereof; and
    a holding member for holding said condenser lens via a cylindrical rotation body so that the condenser lens can be rotated and moved in a predetermined direction.

2. The ranging sensor according to claim 1, wherein the moving direction of said condenser lens includes a component of a direction parallel to a line connecting said light emitting element and said light receiving element.

3. The ranging sensor according to claim 1, wherein said condenser lens is secured to said holding member after the position of the condenser lens has been adjusted so that an appropriate output signal is obtained according to the position of said object.

4. The ranging sensor according to claim 1, wherein said holding member includes: said cylindrical rotation body holding said condenser lens and having the center of rotation at a position different from the center position of the condenser lens; and a cylindrical case for holding said body of rotation so that the rotation body is freely rotatable, and
    said rotation body is rotated and shifted in the condition wherein the rotation body holds said condenser lens and, thereby, said condenser lens is shifted so that the light condensing spot shifts in an arc on said light receiving element.

5. The ranging sensor according to claim 4, wherein the position of the center of said condenser lens and the position of the center of said rotation body are adjusted so that the arc orbit of said light condensing spot does not extend outside of said light receiving element.

6. The ranging sensor according to claim 4, further comprising
    an operation unit provided in said rotation body for operating the rotation body so that the rotation body is rotatable and movable.

7. The ranging sensor according to claim 6, wherein said operation unit is provided so as to protrude from the surface of said rotation body.

8. The ranging sensor according to claim 7, wherein the distance between the center of the rotation body and said operation unit is greater than the amount of eccentricity between the center of the rotation body and the center of the condenser lens.

9. The ranging sensor according to claim 6, wherein said operation unit protrudes from said rotation body to the side.

10. The ranging sensor according to claim 9, wherein the distance between the center of the rotation body and said operation unit is greater than the amount of eccentricity between the center of the rotation body and the center of the condenser lens.

11. The ranging sensor according to claim 4, wherein an application hole for supplying adhesive is provided in said case in order to secure said rotation body after adjustment.

12. The ranging sensor according to claim 11, wherein an embossing process has been carried out on the respective surfaces of said rotation body and of said case, which are adhered to each other.

13. The ranging sensor according to claim 11, further comprising
    a means for restricting shift of the rotation body in the direction toward the axis of revolution, which crosses at right angles the direction of revolution of said rotation body, provided in said case.

14. The ranging sensor according to claim 1, wherein a position detection element or a plurality of photo diode is utilized as said light receiving element.

15. An electronic apparatus provided with the ranging sensor according to claim 1.

* * * * *